United States Patent
Lee et al.

(10) Patent No.: US 11,927,231 B2
(45) Date of Patent: Mar. 12, 2024

(54) COMPOSITE BRAKE ROTOR

(71) Applicant: GM GLOBAL TECHNOLOGY OPERATIONS LLC, Detroit, MI (US)

(72) Inventors: Heewook Lee, Oakland Township, MI (US); Zhongyi Liu, Troy, MI (US); Anil K. Sachdev, Rochester Hills, MI (US); Tyson Whittier Brown, Royal Oak, MI (US); Ratandeep Singh Kukreja, Auburn Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/863,142

(22) Filed: Jul. 12, 2022

(65) Prior Publication Data

US 2024/0019007 A1 Jan. 18, 2024

(51) Int. Cl.
| | |
|---|---|
| *F16D 65/12* | (2006.01) |
| *C22C 21/04* | (2006.01) |
| *C22C 38/02* | (2006.01) |
| *C22C 38/06* | (2006.01) |
| *C22C 38/14* | (2006.01) |

(52) U.S. Cl.
CPC ............ *F16D 65/125* (2013.01); *C22C 21/04* (2013.01); *C22C 38/02* (2013.01); *C22C 38/06* (2013.01); *C22C 38/14* (2013.01); *F16D 2200/0047* (2013.01); *F16D 2200/0082* (2013.01)

(58) Field of Classification Search
None
See application file for complete search history.

(56) References Cited

U.S. PATENT DOCUMENTS

| | | |
|---|---|---|
| 10,260,131 B2 | 4/2019 | Liu et al. |
| 10,294,552 B2 | 5/2019 | Liu et al. |
| 10,519,531 B2 | 12/2019 | Liu et al. |
| 2019/0093197 A1 | 3/2019 | Liu et al. |
| 2021/0017629 A1 | 1/2021 | Liu et al. |

*Primary Examiner* — Anthony M Liang
(74) *Attorney, Agent, or Firm* — Harness, Dickey & Pierce, P.L.C.

(57) ABSTRACT

A brake rotor having a composite structure may include an annular body defining opposite friction surfaces of the brake rotor. The annular body may include a core made of an Al—Si alloy, a thermal barrier layer made of a thermally insulating material disposed on the core, and a wear-resistant layer made of an Fe—Al—Si—Zr alloy disposed on the core over the thermal barrier layer. The wear-resistant layer may define a first one of the opposite friction surfaces of the annular body.

20 Claims, 3 Drawing Sheets

COMPOSITE BRAKE ROTOR

INTRODUCTION

This section provides background information related to the present disclosure which is not necessarily prior art.

The present disclosure generally relates to brake rotors and, more particularly, to composite brake rotors made of lightweight aluminum alloys.

Disc brake assemblies of automotive vehicles include a disc or rotor with a pair of annular friction surfaces on opposite sides thereof. The rotor may be mounted on a rotatable axle of the vehicle, which may be coupled to a wheel of the vehicle. During braking, an outer periphery of the rotor is clamped between a pair of opposing brake pads, which engage the friction surfaces of the rotor and slow or stop rotation of the rotor and the wheel. Brake rotors of automotive vehicles are oftentimes made of cast iron, which can withstand the high friction forces and high temperatures generated during braking.

It may be desirable to manufacture brake rotors of automotive vehicles from relatively lightweight aluminum, instead of cast iron, to decrease the weight of the vehicles. It may be desirable to develop an aluminum alloy brake rotor for an automotive vehicle that exhibits wear-resistance and thermal stability at least as high as that of cast iron.

SUMMARY

This section provides a general summary of the disclosure and is not a comprehensive disclosure of its full scope or all of its features.

The present disclosure relates to a brake rotor having a composite structure. The brake rotor comprises an annular body defining opposite friction surfaces. The annular body comprises a core, a thermal barrier layer, and a wear-resistant layer. The core is made of an Al—Si alloy and includes at least one annular disc having an annular surface. The thermal barrier layer is made of a thermally insulating material and is disposed on the annular surface of the core. The wear-resistant layer is made of an Fe—Al—Si—Zr alloy and is disposed on the annular surface of the core over the thermal barrier layer. The wear-resistant layer defines a first one of the opposite friction surfaces of the annular body.

The Al—Si alloy may be a hypereutectic alloy comprising, by mass, greater than or equal to about 80% to less than or equal to about 87% aluminum and greater than or equal to about 13% to less than or equal to about 20% silicon.

The Al—Si alloy may comprise, by mass, greater than or equal to about 10% to less than or equal to about 20% silicon carbide.

The core may have a density of greater than or equal to about 2,600 kilograms per cubic meter to less than or equal to about 2,700 kilograms per cubic meter and a thickness of greater than or equal to about 9 millimeters to less than or equal to about 36 millimeters.

The thermally insulating material may comprise a high entropy alloy, a high entropy ceramic, or a combination thereof.

The thermally insulating material may have a thermal conductivity of greater than or equal to about 0.4 watts per meter-kelvin to less than or equal to 2 watts per meter-kelvin.

The Fe—Al—Si—Zr alloy may comprise, by mass, greater than or equal to about 45% to less than or equal to about 60% iron, greater than or equal to about 35% to less than or equal to about 45% aluminum, greater than or equal to about 1% to less than or equal to about 3% zirconium, and greater than or equal to about 0.5% to less than or equal to about 2% silicon.

The Fe—Al—Si—Zr alloy may comprise a grain refiner in an amount, by mass, greater than or equal to about 0.05% to less than or equal to about 1% of the Fe—Al—Si—Zr alloy. The grain refiner may comprise at least one of chromium(III) boride and tantalum boride.

The Fe—Al—Si—Zr alloy may have a density of greater than or equal to about 4,800 kilograms per cubic meter to less than or equal to about 5,200 kilograms per cubic meter.

The thermal barrier layer may have a thickness of greater than or equal to about 0.1 millimeters to less than or equal to about 4 millimeters.

The wear-resistant layer may have a thickness of greater than or equal to about 1 millimeter to less than or equal to about 4 millimeters.

The thermal barrier layer may be perforated and may include a plurality of through-holes extending in an axial direction therethrough.

The wear-resistant layer may include a plurality of anchors that extend from an outer surface of the thermal barrier layer into the plurality of through-holes toward the core.

The plurality of anchors may extend from the outer surface of the thermal barrier layer into the plurality of through-holes to the annular surface of the core. In such case, the Fe—Al—Si—Zr alloy of the wear-resistant layer may be metallurgically bonded to the Al—Si alloy of the core via the plurality of anchors.

The core may comprise a pair of first and second annular discs spaced apart from each other in an axial direction by a plurality of ribs.

The present disclosure relates to another brake rotor comprising an annular body that defines opposite first and second friction surfaces of the brake rotor. The annular body comprises a core, first and second thermal barrier layers, and first and second wear-resistant layers. The core is made of an Al—Si alloy and includes a pair of first and second annular discs spaced apart from each other in an axial direction by a plurality of ribs, with each of the first and second annular discs having an annular surface. The first and second thermal barrier layers are made of a thermally insulating material and are respectively disposed on the annular surfaces of the first and second annular discs of the core. The first and second wear-resistant layers are made of an Fe—Al—Si—Zr alloy and are respectively disposed on the annular surfaces of the first and second annular discs over the first and second thermal barrier layers. The first and second wear-resistant layers respectively define the opposite first and second friction surfaces of the annular body.

A method of manufacturing a brake rotor is disclosed. In the method, an Al—Si alloy is cast into a shape of a rotor core that includes at least one annular disc having an annular surface. A thermally insulating material is deposited directly on the annular surface of the rotor core to form a thermal barrier layer. An Fe—Al—Si—Zr alloy is deposited on the annular surface of the rotor core over the thermal barrier layer to form a wear-resistant layer.

The thermally insulating material and the Fe—Al—Si—Zr alloy may be deposited on the annular surface of the rotor core using a directed energy deposition process.

The thermally insulating material may be deposited on the annular surface of the rotor core such that the thermal barrier layer is perforated and includes a plurality of through-holes extending in an axial direction therethrough.

During deposition of the Fe—Al—Si—Zr alloy on the annular surface of the rotor core, the Fe—Al—Si—Zr alloy may flow into and through the through-holes in the thermal barrier layer and form a plurality of anchors that metallurgically bond the Fe—Al—Si—Zr alloy of the wear-resistant layer to the Al—Si alloy of the core.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations and are not intended to limit the scope of the present disclosure.

Corresponding reference numerals indicate corresponding parts throughout the several views of the drawings.

DETAILED DESCRIPTION

Figure 1:
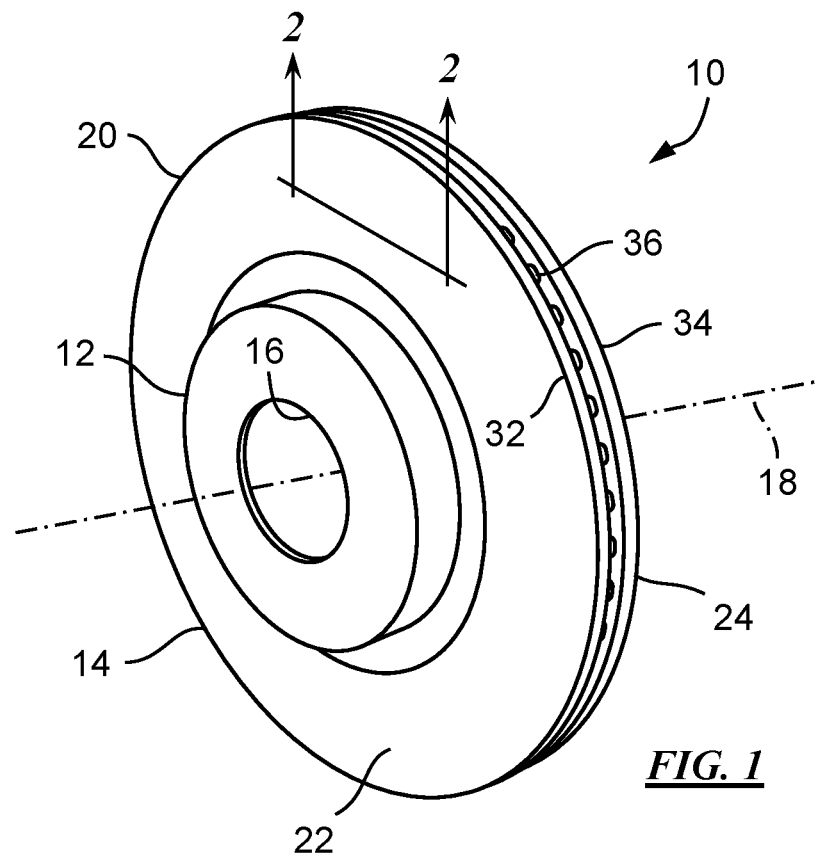
FIG. 1 is a perspective view of a brake rotor for a disc brake assembly of a motor vehicle, wherein the brake rotor includes a hub and an annular body.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended terms "comprises," "comprising," "including," and "having," are to be understood as non-restrictive terms used to describe and claim various embodiments set forth herein, in certain aspects, the terms may alternatively be understood to instead be a more limiting and restrictive term, such as "consisting of" or "consisting essentially of." Thus, for any given embodiment reciting compositions, materials, components, elements, ingredients, features, integers, operations, and/or process steps, the present disclosure also specifically includes embodiments consisting of, or consisting essentially of, such recited compositions, materials, components, elements, ingredients, features, integers, operations, and/or process steps. In the case of "consisting of," the alternative embodiment excludes any additional compositions, materials, components, elements, ingredients, features, integers, operations, and/or process steps, while in the case of "consisting essentially of," any additional compositions, materials, components, elements, ingredients, features, integers, operations, and/or process steps that materially affect the basic and novel characteristics are excluded from such an embodiment, but any compositions, materials, components, elements, ingredients, features, integers, operations, and/or process steps that do not materially affect the basic and novel characteristics can be included in the embodiment.

Any method steps, processes, and operations described herein are not to be construed as necessarily requiring their performance in the order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s), as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges and encompass minor deviations from the given values and embodiments, having about the value mentioned as well as those having exactly the value mentioned. Other than the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

As used herein, the terms "composition" and "material" are used interchangeably to refer broadly to a substance containing at least the preferred chemical constituents, elements, or compounds, but which may also comprise additional elements, compounds, or substances, including trace amounts of impurities, unless otherwise indicated. An "X-based" composition or material broadly refers to compositions or materials in which "X" is the single largest constituent of the composition or material on a weight percentage (%) basis. This may include compositions or materials having, by weight, greater than 50% X, as well as those having, by weight, less than 50% X, so long as X is the single largest constituent of the composition or material based upon its overall weight.

As used herein, the term "metal" may refer to a pure elemental metal or to an alloy of an elemental metal and one or more other metal or nonmetal elements (referred to as "alloying" elements). The alloying elements may be selected to impart certain desirable properties to the alloy that are not exhibited by the base metal element. Alloys described herein may be represented by a sequence of chemical symbols for the base element (e.g., Al) and its major alloying elements (e.g., Si and Fe), with the alloying elements arranged in order of decreasing mass percent (or alphabetically if percentages are similar or equal), e.g., an Al—Si—Fe alloy. Sometimes a number may precede the chemical symbol for one or more of the alloying elements. In such case, the number preceding the chemical symbol for the alloying element represents the average mass percent of that element in the alloy composition, unless otherwise specified. For example, an aluminum alloy comprising, by mass, 7% silicon (Si), 0.25% iron (Fe), and the balance Al may be represented or referred to as an Al-7Si-0.25Fe alloy.

Example embodiments will now be described more fully with reference to the accompanying drawings.

The presently disclosed brake rotor exhibits a composite structure that allows the brake rotor to be relatively light weight (as compared to brake rotors primarily made of cast iron), while also exhibiting exceptional wear resistance and thermal stability. The brake rotor has an annular body with first and second friction surfaces disposed on opposite sides thereof. The annular body comprises a core made of a relatively light weight Al—Si alloy and first and second wear-resistant layers respectively disposed on the first and second friction surfaces of the annular body. The first and second wear-resistant layers are made of an Fe—Al—Si—Zr alloy that is relatively hard and dense, as compared to the Al—Si alloy of the core. First and second thermal barrier layers are respectively sandwiched between the first friction surface and the first wear-resistant layer and between the second friction surface and the second wear-resistant layer. The first and second thermal barrier layers thermally insulate the Al—Si alloy of the core from the relatively high temperatures generated in the first and second wear-resistant layers during braking. For example, the first and second thermal barrier layers disposed on opposite sides of the Al—Si alloy of the core may help maintain the core at a temperature of less than about 350 degrees Celsius (° C.), even in situations where the temperature of the first and second wear-resistant layers is greater than about 550° C.

FIG. 1 depicts a brake rotor 10 for a disc brake assembly of a motor vehicle (not shown). The brake rotor 10 includes a hub 12, an annular body 14, and a central opening 16 that defines an axis of rotation 18 of the brake rotor 10. The hub 12 may be configured to mount the brake rotor 10 to a rotatable axle of the motor vehicle. The annular body 14 extends in a radial direction from the central opening 16 and defines an outer periphery 20 of the brake rotor 10 and first and second friction surfaces 22, 24 disposed on opposite sides of the brake rotor 10. The first and second friction surfaces 22, 24 are configured to engage with brake pads (not shown) disposed on opposite sides of the brake rotor 10 to generate frictional forces that oppose rotation of the brake rotor 10 during braking.

The presently disclosed brake rotor 10 may exhibit other configurations, as will be appreciated by persons of ordinary skill in the art. For example, in some aspects, the hub 12 may be omitted and the brake rotor 10 may be coupled to a rotatable axle of a motor vehicle by other means.

Figure 2:
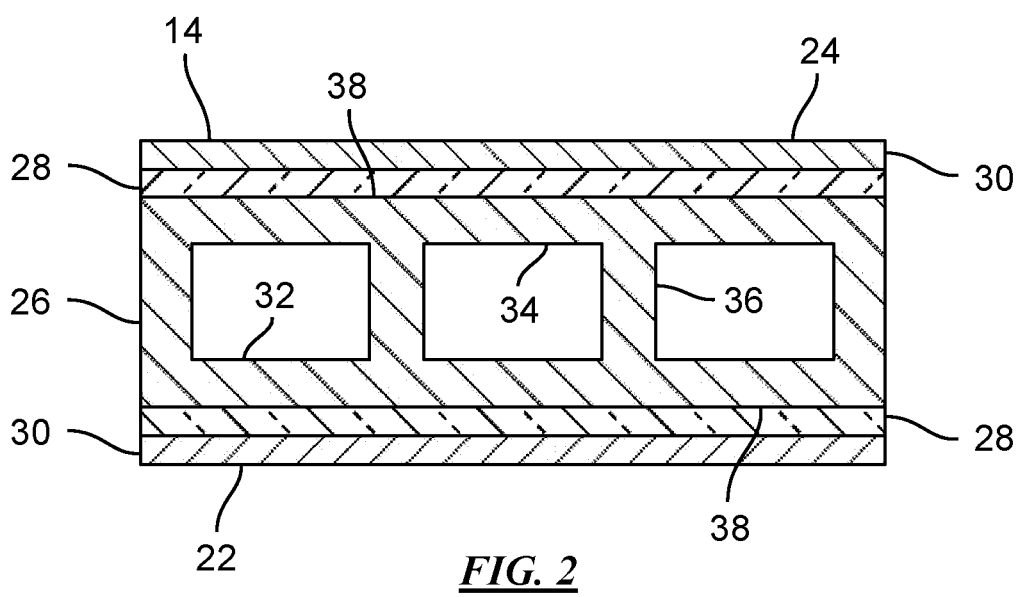
FIG. 2 is schematic cross-sectional view of the annular body of FIG. 1 taken along line 2-2 of FIG. 1, wherein the annular body includes a core, first and second thermal barrier layers disposed on the core, and first and second wear-resistant layers disposed on the core over the first and second thermal barrier layers.

Referring now to FIGS. 1 and 2, the annular body 14 exhibits a composite structure comprising a core 26, first and second thermal barrier layers 28, and first and second wear-resistant layers 30. The core 26 includes at least one annular disc that defines a pair of annular surfaces disposed on opposite sides of the brake rotor 10 and facing away from the core 26. The core 26 depicted in FIGS. 1 and 2 includes a pair of first and second annular discs 32, 34 disposed on opposite sides of the brake rotor 10 and spaced apart from each other in an axial direction by a plurality of ribs 36. Each of the first and second annular discs 32, 34 has an annular surface 38 that faces away from the core 26. The core 26 may have a thickness, measured between the opposite annular surfaces 38, of greater than or equal to about 9 millimeters to less than or equal to about 36 millimeters. The core 26 may be of unitary one-piece construction.

The core 26 is made of a hypereutectic aluminum alloy comprising, in addition to aluminum, at least one alloying element including silicon (Si), and thus may be referred to as an Al—Si alloy. The amount of silicon in the Al—Si alloy is selected to provide the Al—Si alloy with good castability, fluidity, and wear-resistance. The Al—Si alloy may comprise, by mass, greater than or equal to about 80% to less than or equal to about 87% aluminum and greater than or equal to about 13% to less than or equal to about 20% silicon.

In some aspects, the Al—Si alloy may comprise carbon (C) as an alloying element. In such case, the Al—Si alloy may comprise, by mass, greater than or equal to about 4% to less than or equal to about 8% carbon. The carbon may be present in the Al—Si alloy in the form of silicon carbide (SiC). In such case, the Al—Si alloy may comprise, by mass, greater than or equal to about 10% to less than or equal to about 20% silicon carbide.

As compared to cast iron, the Al—Si alloy exhibits excellent corrosion resistance, high ductility, and low density. For example, the Al—Si alloy may have a density of greater than or equal to about 2,600 kilograms per cubic meter ($kg/m^3$) to less than or equal to about 2,800 $kg/m^3$ or less than or equal to about 2,700 $kg/m^3$. In one specific example, the Al—Si alloy may have a density of about 2,700 $kg/m^3$. The Al—Si alloy may exhibit a thermal conductivity of greater than or equal to about 186 watts per meter-kelvin (W/m·K) to less than or equal to about 225 W/m·K and a specific heat of greater than or equal to about 0.9 kJ/kg·K to less than or equal to about 1.3 kJ/kg·K.

The first and second thermal barrier layers 28 are respectively disposed on the opposite annular surfaces 38 of the core 26 and are configured to inhibit heat transfer from the first and second friction surfaces 22, 24 of the brake rotor 10 to the core 26 during braking. In aspects, the first and second thermal barrier layers 28 may be deposited directly on the opposite annular surfaces 38 of the core 26. The thermal barrier layers 28 may help maintain the core 26 at a temperature of less than about 350° C., even in situations where the temperature of the first and second wear-resistant layers 30 is greater than about 550° C. Each of the first and second thermal barrier layers 28 may have a thickness, measured from the annular surface 38 of the core 26, of greater than or equal to about 0.1 millimeters to less than or equal to about 4 millimeters or less than or equal to about 2 millimeters. The thermal barrier layers 28 may be substantially coextensive with the annular surfaces 38 of the core 26.

The first and second thermal barrier layers 28 may be made of a thermally insulating material having a relatively low thermal conductivity, as compared to the thermal conductivity of the core 26 and the first and second wear-resistant layers 30. For example, the thermal conductivity of the thermally insulating material may be about 5-20% of that of the wear-resistant layers 30. The thermal conductivity of the thermally insulating material may be greater than or equal to about 0.4 W/m·K or about 0.5 W/m·K to less than or equal to 2 W/m·K or about 0.7 W/m·K. The thermally insulating material may have a density of about 1,460 $kg/m^3$ and a specific heat of about 1.5 kJ/kg·K.

The thermally insulating material of the thermal barrier layers 28 may comprise a high entropy alloy, a high entropy ceramic, or a combination thereof. A high entropy alloy or ceramic material is an inorganic alloy or ceramic material that (i) comprises at least four elements, with each element being present in the alloy or ceramic at a concentration, on an atomic basis, of greater than or equal to about 5% to less than or equal to about 35%, and/or (ii) exists in the form of a solid solution with no intermetallic phases. Examples of high entropy alloys include bismuth and tellurium (Bi—Te)-based materials and bismuth, antimony, tellurium, and selenium (Bi—Sb—Te—Se)-based materials, e.g., $BiSbTe_{1.5}Se_{1.5}$ and/or $(BiSbTe_{1.5}Se_{1.5})_{1-x}Ag_x$, where x is about 0.9 atomic percent. Examples of high entropy ceramics include zirconate ($Zr_xO_y^{-z}$)-based materials and rare earth metal zirconate ($RE_2Zr_2O_7$)-based materials, where RE is $La_2O_3$, $Nd_2O_3$, $Sm_2O_3$, $Eu_2O_3$, $Gd_2O_3$, and/or $Y_2O_3$.

The first and second wear-resistant layers 30 are respectively disposed on the first and second thermal barrier layers 28 and respectively define the first and second friction surfaces 22, 24 of the brake rotor 10. In aspects, the first and second wear-resistant layers 30 may be directly deposited on the first and second thermal barrier layers 28, respectively. The first and second wear-resistant layers 30 are configured to provide the first and second friction surfaces 22, 24 of the brake rotor 10 with high wear-resistance and excellent thermal stability. For example, the first and second wear-resistant layers 30 may be formulated to exhibit exceptional mechanical stability at high temperatures, e.g., at temperatures of up to about 1,300° C. Each of the first and second wear-resistant layers 30 may have a thickness, measured from the surface of the adjacent thermal barrier layer 28, of greater than or equal to about 1 millimeter to less than or equal to about 4 millimeters or less than or equal to about 3 millimeters. The wear-resistant layers 30 may be substantially coextensive with the thermal barrier layers 28 and the annular surfaces 38 of the core 26.

The first and second wear-resistant layers 30 are made of an iron alloy comprising, in addition to iron (Fe), alloying elements of aluminum (Al), silicon (Si), and zirconium (Zr), and thus may be referred to as an Fe—Al—Si—Zr alloy. The amount of aluminum, silicon, and zirconium in the iron alloy are selected to provide the Fe—Al—Si—Zr alloy with high strength, exceptional wear resistance, oxidation resistance, and corrosion resistance. The Fe—Al—Si—Zr alloy may comprise, by mass, greater than or equal to about 45% to less than or equal to about 60% iron, greater than or equal to about 35% to less than or equal to about 45% aluminum, greater than or equal to about 1% to less than or equal to about 3% zirconium, and greater than or equal to about 0.5% to less than or equal to about 2% silicon. In one example, the Fe—Al—Si—Zr alloy may comprise, by mass, about 59% iron, about 36% aluminum, about 3% zirconium, and about 1% silicon. In the Fe—Al—Si—Zr alloy, the iron, aluminum, silicon, and zirconium may be present in the form of FeAlSiZr-containing intermetallic particles.

In some aspects, the Fe—Al—Si—Zr alloy may comprise a grain refiner. Examples of grain refiners include boride compounds, e.g., chromium(III) boride (CrB) and/or tantalum boride (TaB and/or $TaB_2$). In aspects where the grain refiner comprises chromium(III) boride and tantalum boride, the mass ratio of chromium(III) boride to tantalum boride in the Al—Fe—Si—Zr alloy may be about 1:1. The grain refiner may be present in the Fe—Al—Si—Zr alloy in an amount, by mass, greater than or equal to about 0.05% to less than or equal to about 1% of the Fe—Al—Si—Zr alloy.

The Fe—Al—Si—Zr alloy may exhibit a relatively high density, as compared to the density of the Al—Si alloy and/or the thermally insulating material. For example, the Fe—Al—Si—Zr alloy has a density of greater than or equal to about 4,800 $kg/m^3$ to less than or equal to about $kg/m^3$. In one example, the Fe—Al—Si—Zr alloy may have a density of about 4,990 $kg/m^3$. The Fe—Al—Si—Zr alloy may have a thermal conductivity of greater than or equal to about 11 W/m·K to less than or equal to about 13 W/m·K and a specific heat of greater than or equal to about 0.61 kJ/kg·K to less than or equal to about 0.67 kJ/kg·K.

Additional elements not intentionally introduced into the composition of the presently disclosed Al—Si alloy and/or the Fe—Al—Si—Zr alloy nonetheless may be inherently present in the alloys in relatively small amounts, for example, in individual and/or cumulative amounts, by mass, less than or equal to about 0.1%, optionally less than or equal to about 0.05%, or optionally less than or equal to about 0.01% of the alloys. Such elements may be present, for example, as impurities in the raw or scrap materials used to prepare the alloys. In embodiments where the alloys are referred to as comprising one or more alloying elements (e.g., Si) and aluminum or iron as balance, the term "as balance" does not exclude the presence of additional elements not intentionally introduced into the composition of the alloys but nonetheless inherently present in the alloys in relatively small amounts, e.g., as impurities.

Figure 3:
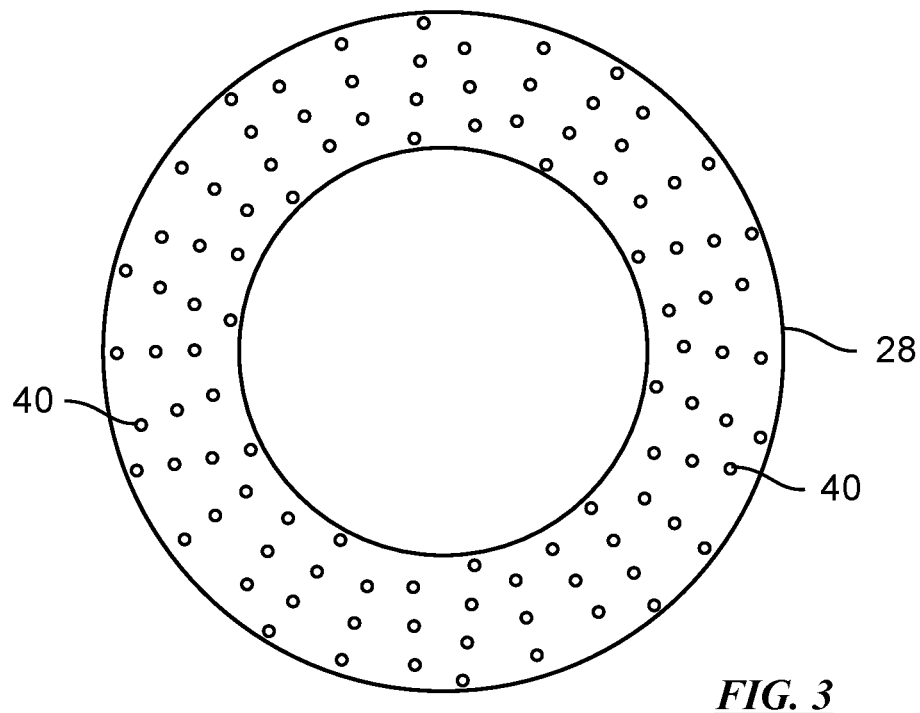
FIG. 3 is schematic cross-sectional view of a thermal barrier layer having a perforated structure and including a plurality of through-holes extending therethrough.
Figure 4:
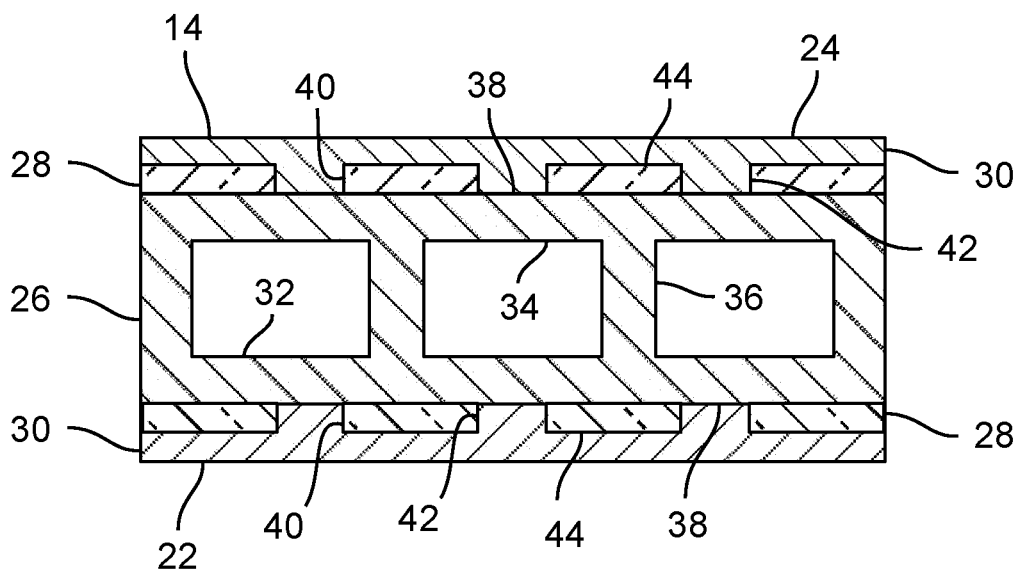
FIG. 4 is schematic cross-sectional view of an annular body of a brake rotor, wherein the annular body includes a core, perforated first and second thermal barrier layers disposed on the core, and first and second wear-resistant layers disposed on the core over the first and second thermal barrier layers, and wherein the first and second wear-resistant layers each include a plurality of anchors that respectively extend from outer surfaces of the first and second thermal barrier layers into the plurality of through-holes in the perforated first and second thermal barrier layers to the core.

Referring now to FIGS. 3 and 4, in some aspects, the first and second thermal barrier layers 28 may be perforated. As shown in FIG. 3, the thermal barrier layers 28 may include a plurality of through-holes 40 extending in an axial direction through the thermal barrier layers 28. In aspects, the through-holes 40 may extend entirely through the thermal barrier layers 28 to the core 26. In such case, as shown in FIG. 4, the first and second wear-resistant layers 30 may each include a plurality of anchors 42 that respectively extend from an outer surface 44 of the first and second thermal barrier layers 28 into the plurality of through-holes 40 in the thermal barrier layers 28 to the annular surfaces 38 of the core 26. In such case, the Fe—Al—Si—Zr alloy of the wear-resistant layers 30 may be metallurgically bonded to the Al—Si alloy of the core 26 via the plurality of anchors 42.

A method of manufacturing the brake rotor 10 may include one or more of the following steps. In a first step, the Al—Si alloy may be cast into the shape of the core 26. In a second step, the thermally insulating material may be deposited directly respective the annular surfaces 38 of the core 26 to form the first and second thermal barrier layers 28. In some aspects, the thermally insulating material may be selectively deposited on the annular surfaces 38 of the core 26 in a predefined pattern, for example, such that the resulting first and second thermal barrier layers 28 are perforated and include the plurality of through-holes 40. In a third step, the Fe—Al—Si—Zr alloy may be deposited on the annular surfaces of the core 29 over the first and second thermal barrier layers 28 to form the first and second wear-resistant layers 30. In aspects where the first and second thermal barrier layers 28 are perforated, the Fe—Al—Si—Zr alloy may flow into the plurality of through-holes 40 and form the plurality of anchors 42, which may metallurgically bond with the annular surfaces 38 of the core 26.

Figure 5:
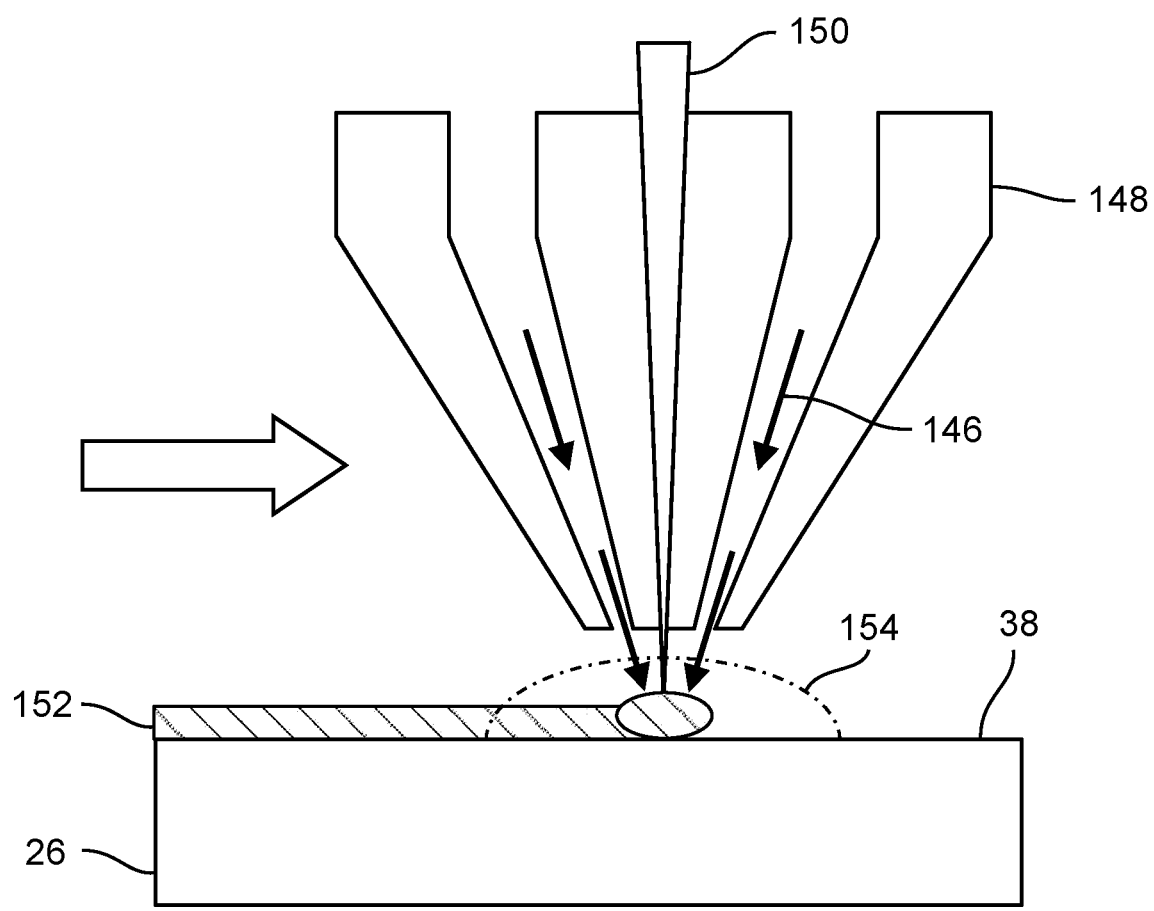
FIG. 5 is a schematic cross-sectional view of an apparatus for depositing the first and second thermal barrier layers and the first and second wear-resistant layers on the core of the annular body of FIGS. 2 and 4.

Referring now to FIG. 5, in some aspects, the thermally insulating material and the Fe—Al—Si—Zr alloy may be respectively and sequentially deposited on the annular surfaces 38 of the core 26 using directed energy deposition processes. During the directed energy deposition processes, a feedstock material 146 is deposited by a nozzle 148 on the annular surface 38 of the core 26 and simultaneously melted by application of a focused energy source 150 thereto. The nozzle 148 and focused energy source 150 are advanced along the annular surface 38 of the core 26 in a predefined pattern, leaving behind a layer of solidified feedstock material 152. The focused energy source may be a plasma arc, electron beam, or laser. A shielding gas may be applied to a zone 154 surrounding the deposition site to prevent or inhibit undesired side reactions. The feedstock material may be in the form of a wire or a powder and may exhibit substantially the same composition as the layer being formed. For example, during formation of the first and second thermal barrier layers 28, the feedstock material 152 may have substantially the same composition as that of the thermally insulating material. Likewise, during formation of the first and second wear-resistant layers 30, the feedstock material 152 may have substantially the same composition as that of the Fe—Al—Si—Zr alloy.

The foregoing description of the embodiments has been provided for purposes of illustration and description. It is not intended to be exhaustive or to limit the disclosure. Individual elements or features of a particular embodiment are generally not limited to that embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A brake rotor having a composite structure, the brake rotor comprising:
   an annular body defining opposite friction surfaces, the annular body comprising:
      a core made of an Al—Si alloy and including at least one annular disc having an annular surface,
      a thermal barrier layer made of a thermally insulating material disposed on the annular surface of the core, and
      a wear-resistant layer made of an Fe—Al—Si—Zr alloy disposed on the annular surface of the core over the thermal barrier layer, the wear-resistant layer defining a first one of the opposite friction surfaces of the annular body.

2. The brake rotor of claim 1, wherein the Al—Si alloy is a hypereutectic alloy comprising, by mass, greater than or equal to about 80% to less than or equal to about 87% aluminum and greater than or equal to about 13% to less than or equal to about 20% silicon.

3. The brake rotor of claim 2, wherein the Al—Si alloy comprises, by mass, greater than or equal to about 10% to less than or equal to about 20% silicon carbide.

4. The brake rotor of claim 1, wherein the core has a density of greater than or equal to about 2,600 kilograms per cubic meter to less than or equal to about 2,700 kilograms per cubic meter and a thickness of greater than or equal to about 9 millimeters to less than or equal to about 36 millimeters.

5. The brake rotor of claim 1, wherein the thermally insulating material comprises a high entropy alloy, a high entropy ceramic, or a combination thereof.

6. The brake rotor of claim 1, wherein the thermally insulating material has a thermal conductivity of greater than or equal to about 0.4 watts per meter-kelvin to less than or equal to 2 watts per meter-kelvin.

7. The brake rotor of claim 1, wherein the Fe—Al—Si—Zr alloy comprises, by mass, greater than or equal to about 45% to less than or equal to about 60% iron, greater than or equal to about 35% to less than or equal to about 45% aluminum, greater than or equal to about 1% to less than or equal to about 3% zirconium, and greater than or equal to about 0.5% to less than or equal to about 2% silicon.

8. The brake rotor of claim 1, wherein the Fe—Al—Si—Zr alloy comprises a grain refiner in an amount, by mass, greater than or equal to about 0.05% to less than or equal to about 1% of the Fe—Al—Si—Zr alloy, and wherein the grain refiner comprises at least one of chromium(III) boride and tantalum boride.

9. The brake rotor of claim 1, wherein the Fe—Al—Si—Zr alloy has a density of greater than or equal to about 4,800 kilograms per cubic meter to less than or equal to about 5,200 kilograms per cubic meter.

10. The brake rotor of claim 1, wherein the thermal barrier layer has a thickness of greater than or equal to about 0.1 millimeters to less than or equal to about 4 millimeters.

11. The brake rotor of claim 1, wherein the wear-resistant layer has a thickness of greater than or equal to about 1 millimeter to less than or equal to about 4 millimeters.

12. The brake rotor of claim 1, wherein the thermal barrier layer is perforated and includes a plurality of through-holes extending in an axial direction therethrough.

13. The brake rotor of claim 12, wherein the wear-resistant layer includes a plurality of anchors that extend from an outer surface of the thermal barrier layer into the plurality of through-holes toward the core.

14. The brake rotor of claim 13, wherein the plurality of anchors extend from the outer surface of the thermal barrier layer into the plurality of through-holes to the annular surface of the core, and wherein the Fe—Al—Si—Zr alloy of the wear-resistant layer is metallurgically bonded to the Al—Si alloy of the core via the plurality of anchors.

15. The brake rotor of claim 1, wherein the core comprises a pair of first and second annular discs spaced apart from each other in an axial direction by a plurality of ribs.

16. A brake rotor having a composite structure, the brake rotor comprising:
   an annular body defining opposite first and second friction surfaces, the annular body comprising:
      a core made of an Al—Si alloy and including a pair of first and second annular discs spaced apart from each other in an axial direction by a plurality of ribs, each of the first and second annular discs having an annular surface,
      first and second thermal barrier layers made of a thermally insulating material and respectively disposed on the annular surfaces of the first and second annular discs of the core, and
      first and second wear-resistant layers made of an Fe—Al—Si—Zr alloy and respectively disposed on the annular surfaces of the first and second annular discs over the first and second thermal barrier layers, the first and second wear-resistant layers respectively define the opposite first and second friction surfaces of the annular body.

17. A method of manufacturing the brake rotor of claim 1, the method comprising:
   casting an Al—Si alloy into a shape of a rotor core including at least one annular disc having an annular surface;
   depositing a thermally insulating material directly on the annular surface of the rotor core to form a thermal barrier layer; and
   depositing an Fe—Al—Si—Zr alloy on the annular surface of the rotor core over the thermal barrier layer to form a wear-resistant layer.

18. The method of claim 17, wherein the thermally insulating material and the Fe—Al—Si—Zr alloy are deposited on the annular surface of the rotor core using a directed energy deposition process.

19. The method of claim 17, wherein the thermally insulating material is deposited on the annular surface of the rotor core such that the thermal barrier layer is perforated and includes a plurality of through-holes extending in an axial direction therethrough.

20. The method of claim 19, wherein, during deposition of the Fe—Al—Si—Zr alloy on the annular surface of the rotor core, the Fe—Al—Si—Zr alloy flows into and through the through-holes in the thermal barrier layer and forms a plurality of anchors that metallurgically bond the Fe—Al—Si—Zr alloy of the wear-resistant layer to the Al—Si alloy of the rotor core.

* * * * *